Nov. 21, 1950     C. G. EMERSON ET AL     2,530,865
CHANGE MAKER

Filed March 29, 1946                                                    7 Sheets-Sheet 1

INVENTORS
Charles G. Emerson
Lee R. Cook
BY Victor J. Evans & Co.
ATTORNEYS

Nov. 21, 1950   C. G. EMERSON ET AL   2,530,865
CHANGE MAKER

Filed March 29, 1946   7 Sheets-Sheet 5

INVENTORS
Charles G. Emerson
Lee R. Cook
BY Victor J. Evans & Co.
ATTORNEYS

Nov. 21, 1950   C. G. EMERSON ET AL   2,530,865
CHANGE MAKER
Filed March 29, 1946   7 Sheets-Sheet 6
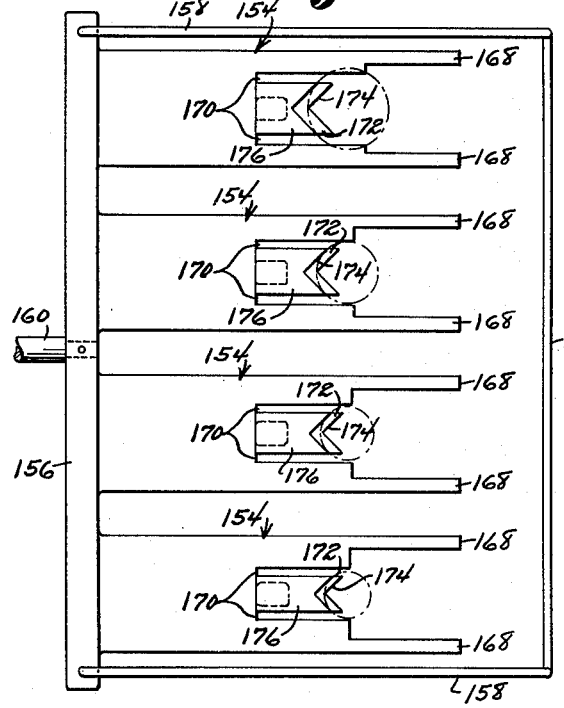
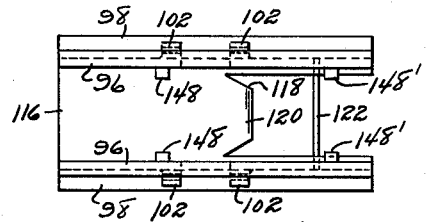
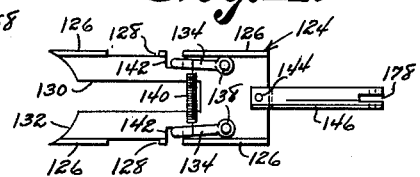
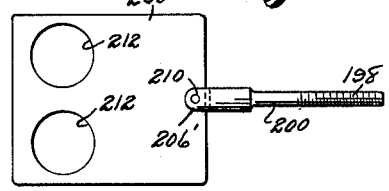
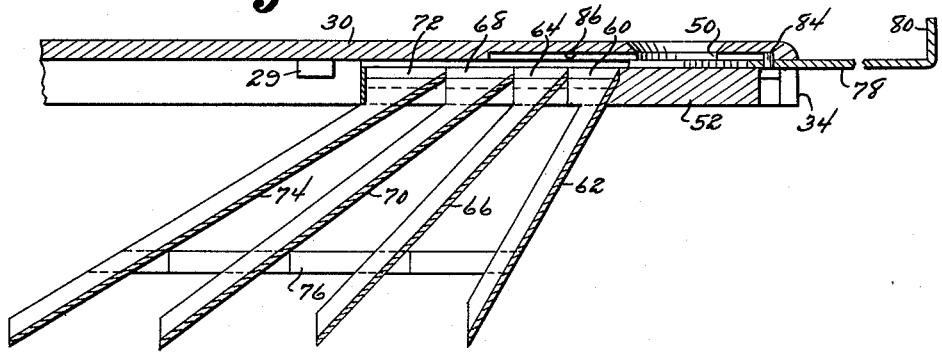
INVENTORS
Charles G. Emerson
Lee R. Cook
BY Victor J. Evans & Co.
ATTORNEYS Nov. 21, 1950 — C. G. EMERSON ET AL — 2,530,865
CHANGE MAKER
Filed March 29, 1946 — 7 Sheets-Sheet 7

INVENTORS
Charles G. Emerson
Lee R. Cook
BY Victor J. Evans & Co.
ATTORNEYS

Patented Nov. 21, 1950

2,530,865

UNITED STATES PATENT OFFICE 2,530,865

CHANGE MAKER

Charles G. Emerson and Lee R. Cook,
Rowlesburg, W. Va.

Application March 29, 1946, Serial No. 658,116

1 Claim. (Cl. 194—80)

This invention relates to change makers and has among its object and advantages the provision of an improved change making device, wherein a plurality of coins of predetermined denomination are arranged in a series of columns, in which novel means are provided for removing the lowermost coin in each column upon insertion of a coin of predetermined larger denomination and subsequent actuation of the device.

Coins of different denominations vary in size and an object of the invention is to provide a device which will pass the coins over a base partition having openings of predetermined sizes, through which the coins may drop according to their size.

The first openings being smallest will permit only dimes to drop through and since the other coins are larger they will pass over subsequent openings when projected forward until openings of corresponding sizes are reached at which time these coins will drop through such openings. Thus a device of this character requires the use of only one coin receiving slot to handle coins of different denominations.

With the above and other objects and advantages in view the invention consists of the novel details of construction, arrangement and combination of parts more fully hereinafter described, claimed, and illustrated in the accompanying drawings in which:

Figure 10 is a plan view of the floor plate of the feeding mechanism;

Figure 11 is a bottom plan view of a coin actuator plate;

Figure 12 is a plan view of a battery of coin pushing plates;

Figure 13 is a plan view of a coin discharge plate;

Figure 14 is a sectional view on the line 14—14 of Figure 1;

Figure 1:
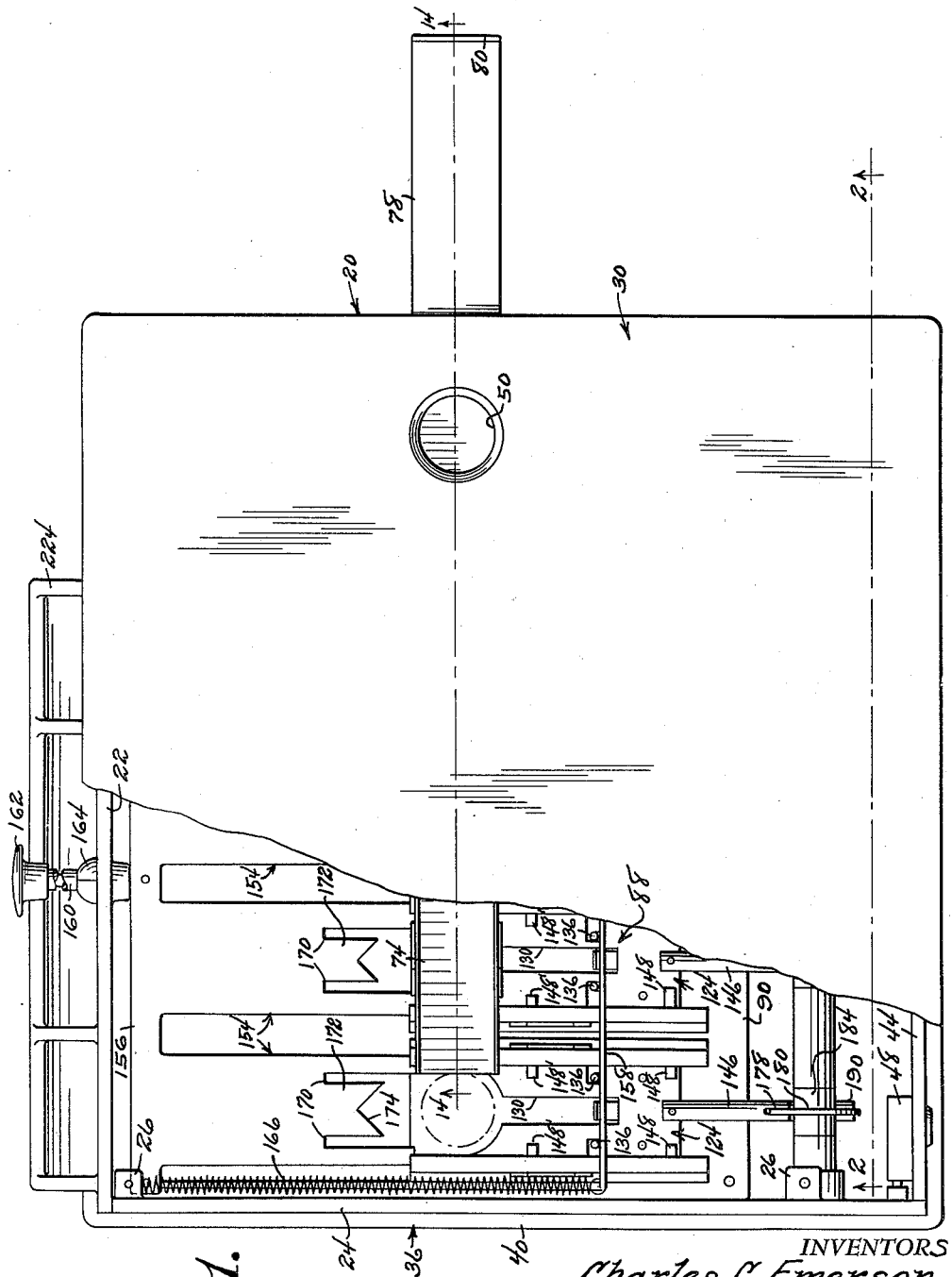
Figure 1 is a top plan view partly broken away of an embodiment of the invention.

Referring more in detail to the drawings the reference numeral 20 designates the cabinet which encloses the change making device except for the coin receiving slide and discharge trays which extend outwardly therefrom and the rod for manipulation of the coin receiving plate likewise extending outwardly from the cabinet.

The cabinet comprises front wall 22 and side walls 24 and the walls are provided with inset inner flanges 26 at the top thereof and marginal flanges 28 at the bottom thereof. The flanges 26 engage the depending lugs 29 on the removable top 30 and are secured thereto by fasteners 32 and a depending marginal flange 34 on the top engages the outer top edges of the walls. The flanges 28 lie flush with the removable bottom 36 and are secured thereto by fasteners 38 and the bottom is provided with the upstanding marginal flange 40 to engage the outer bottom edges of the walls.

The top at its rear edge is provided with depending lugs 42 which are parallel to but spaced from the flange 34 between which the removable back wall 44 is mounted at the top thereof and the bottom 36 is provided with upstanding lugs 46 which are parallel to but spaced from the flange 40 between which the removable back wall 44 is mounted at the bottom edge thereof. To apply the back wall, it is only necessary to insert its upper edge between the lugs 42 and flange 34 and slide the wall upwardly to clear the flange 40 and then pushed inwardly and allow it to drop between lugs 46 and flange 40. The back wall is secured in closed position to the lock 48.

The top 30 is provided with coin receiving opening 50 through which coins of different denominations are deposited for change making purposes. A coin dropped through the opening 50 will fall on the chute supporting plate 52 provided with laterally extending apertured flanges 54 whereby the chute may be secured to the top 30 by fasteners 56 entering the parallel guide lugs 58.

The plate 52 is provided with a square shaped opening 60 for dimes, and the chute 62 communicates therewith, a square shaped opening 64 and communicating chute 66 for nickels, a square shaped opening 68 and communicating chute 70 for quarters, and a square shaped opening 72 and communicating chute 74 for half dollars, and the chutes are retained in alinement by the conforming bands 76 secured to the sides of the chute. The coin slide 78 having the upturned handle end 80 positioned intermediate the guide lugs 58 is provided with the bifurcated end 82 which communicates with the opening 50 to receive the coin and pushes the coin forward upon inward pressure on the end 80 to drop the coin through the appropriate square shaped opening. The slide 78 is provided with the pin 84 which engages the elongated slot 86 in the cover 30 to limit the movement of the slide during its withdrawal to receive a coin or its forward movement to drop the coin in its appropriate square shaped opening.

Coins from the chutes depending on their denomination are dropped into one of the battery of feeding mechanisms 88 positioned immediately below the end of the chute and are mounted on the partition 90 secured to inwardly extending lugs 92 on the front and sidewalls by means of fasteners 94.

The feeding mechanisms 88 comprise the parallel relatively spaced side walls 96 having lower marginal edge flanges 98 which are secured to the partition 90 by fasteners 100. The side walls 96 at approximately the center thereof are provided with outwardly extending lugs 102 in which are pivotally mounted by means of the pins 104 the dogs or latches 106 having the inturned upper ends 108 which extend inwardly of the walls 96 by means of oppositely positioned openings therein and openings 110 intermediate the lugs 102 permit a tension spring 112 to be connected to the dogs or latches 106 by means of eyes 114 secured to the dogs 106. Immediately below and engaging the inturned ends 108 is the plate 116 which is secured to the sidewalls and the plate extends partly beyond the center of the ends 108 to taper inwardly at 118 to the reduced downwardly curved end 120 and the remainder of the walls are retained in alinement by the transverse pin 122. Slidably mounted on the plate 116 is the coin actuator plate 124, having the depending flanges 126 recessed at 128 to receive the ends 108 of the dogs 106 and provided with the longitudinally extending open ended slot 130 at the center thereof which communicates with the semi-elliptical front end 132. Dogs 134 having upstanding ends 136 are pivotally mounted by pins 138 on the undersurface of the plate 124 and a spring 140 connected to the dogs force the dogs inwardly into opposed seats 142 provided in the flange and plate 124. The plate at the rear thereof has a pin 144 in the center thereof to pivotally connect the link 146 thereon. Secured to the side walls are the stops 148 and 148', which overlap and have sliding engagement with the plate 124. The upper ends of the walls 96 are provided with channel shaped guide flanges 152 to slidably receive the coin pusher plate 154, there being one for each feeding mechanism and the plates are connected at their face ends in spaced relation to each other to the bar 156 which extends transversely of the cabinet, and a rod frame 158 connected to the ends of the bar extends at right angles therefrom parallel to the plates 154. A push rod 160 connected to the center of the bar 156 extends outwardly of the cabinet 10 and is provided with a knob 162 for the manipulation thereof and a bearing 164 is provided in the front wall of the cabinet for the rod 160. When the bar and frame connected thereto are pushed inwardly by the rod the springs 166 will return the bar to normal position.

The plates 154 are provided with forwardly extending opposed parallel arms 168 having formed intermediately thereof the opposed parallel slots 170 forming the extension 172 having the V-shaped end 174 and provided on the under surface of the extension with the V-shaped coin pushers 176, and the rear end of each pusher 176 formed integral with the under surface of the plate enters its respective slot 130. It being understood that the size of the plates depends upon the denomination of the coins received therein, coins dropping from the respective chutes will drop on the plates 116 whereon the knob 162 will be pushed inwardly until the coin is engaged by the pusher 176. Continued forward movement of the coin will engage the dogs 106 releasing the plate 124, and when the coin engages the dogs 134 the plate 124 will be pushed rearwardly until the upturned ends 136 of the dogs 134 engage the stops 148' at which time the coin will drop into the cabinet. All of the plates 154 will move rearwardly simultaneously but only the one carrying a coin therein will actuate its plate 124 as previously described.

The links 146 are provided with bifurcated ends 178 which receive and are pivoted to the levers 180 by a pin 182 and the levers 180 are fulcrumed at 184 on the bar 186 which is secured in brackets 188 on the inner surface of the side wall 24. The lever is pivoted in the bifurcated end 191 of the link 190 by means of a pin 192 and the link has a threaded end 194 to receive the turn buckle 196 which has engagement with the threaded end 198 of the link 200 and the links and turn buckles are kept in alinement by means of the sleeves 202 mounted on the bar intermediate of the fulcrums of the levers and the brackets 188. The bar is mounted into the brackets through apertures 204 in the sidewalls 24 and retained in one of the brackets by a pin 206.

The link 200 has a bifurcated end 206 which is connected to a coin discharge plate 208 by a pin 210 and the plate is provided with suitable openings 212 for receipt of coins in change for the coin deposited. The plates 208 are slidably supported within the housings 214 secured to an enlargement 216 formed on the inner surface of the front wall 22 by fasteners 218 engaging the flange 220 on the housings. The housings are provided with coin columns 222 which contain the proper denomination of coins which will be discharged as change in return for the coin deposited.

Figure 2:
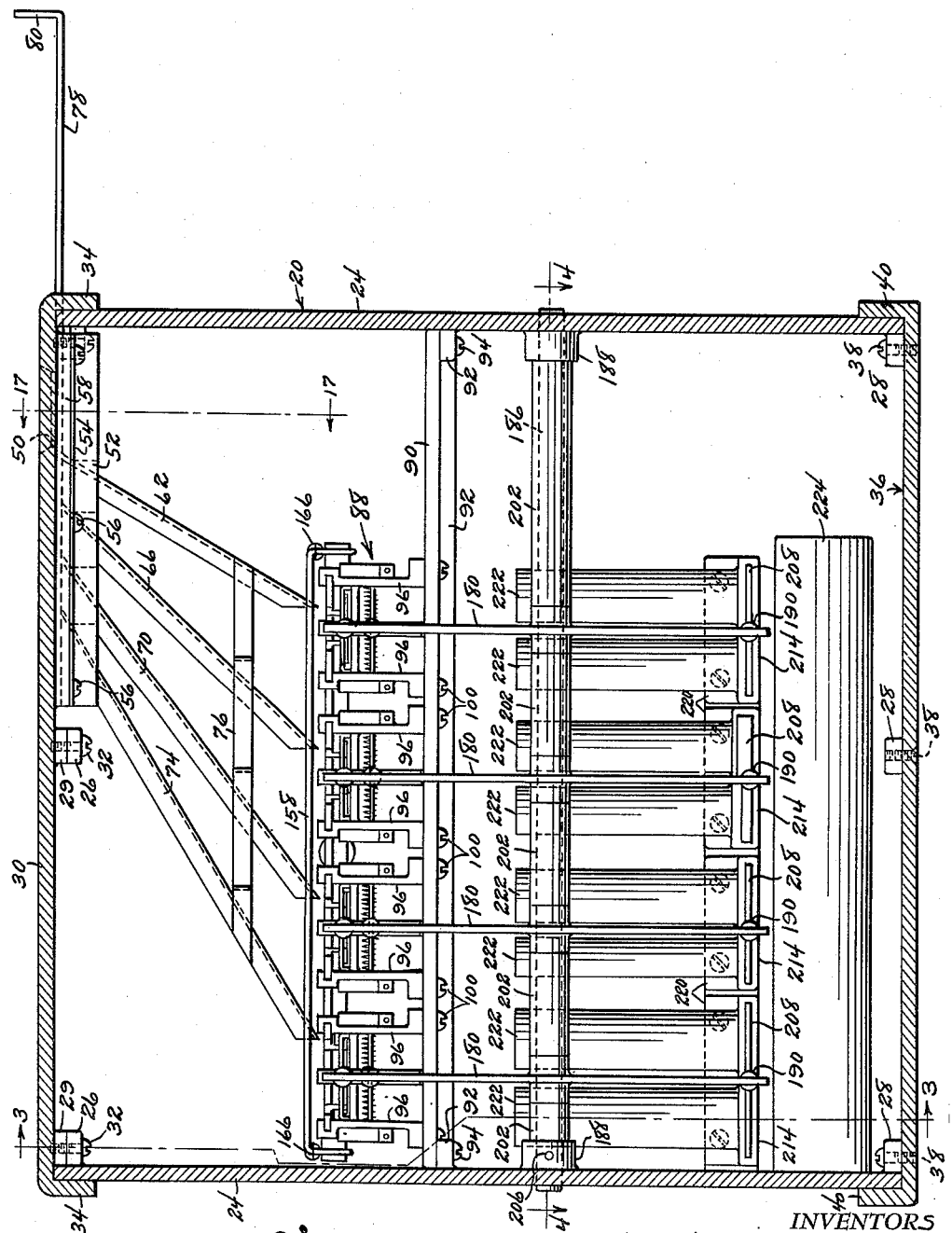
Figure 2 is a sectional view on the line 2—2 of Figure 1.
Figure 3:
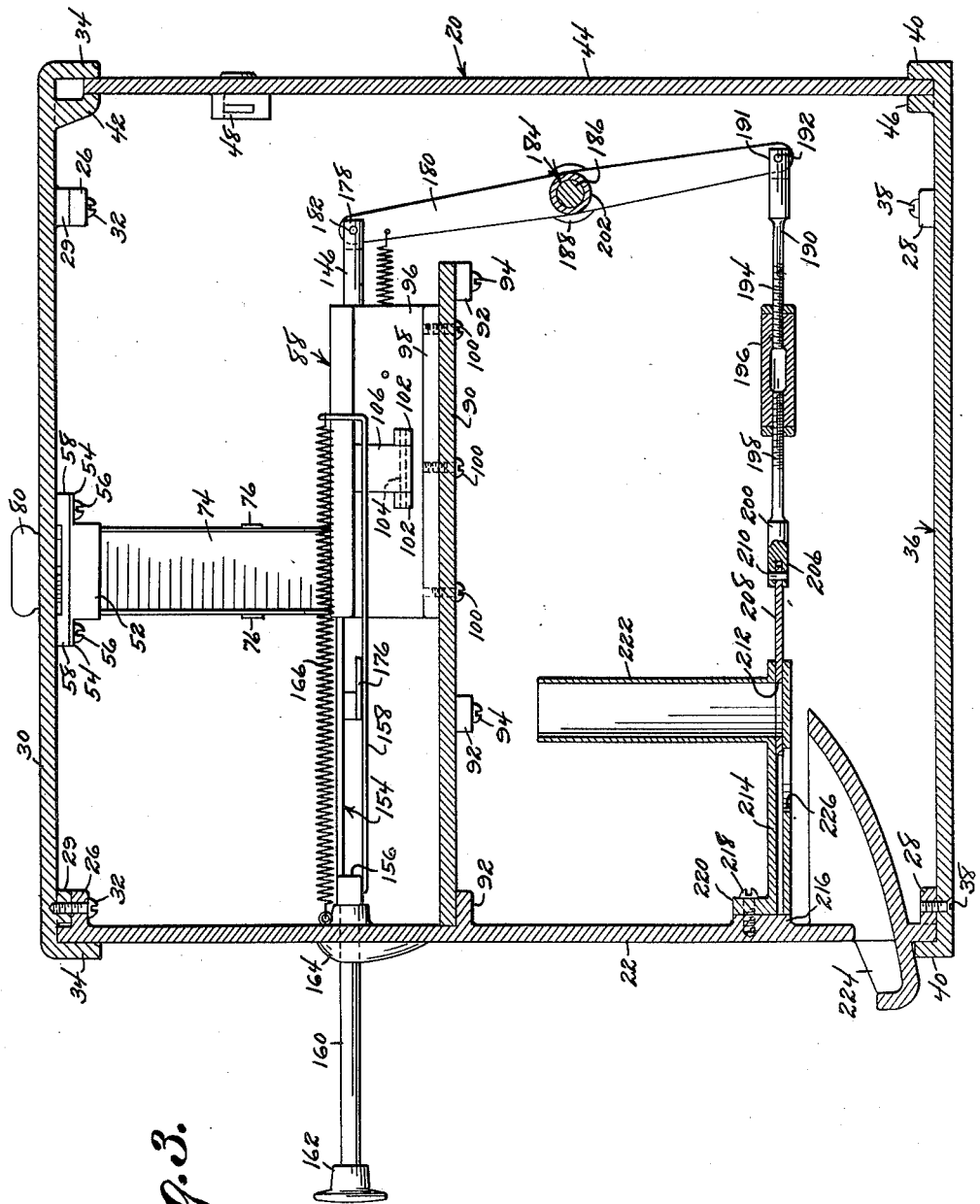
Figure 3 is a sectional view on the line 3—3 of Figure 2.
Figure 4:
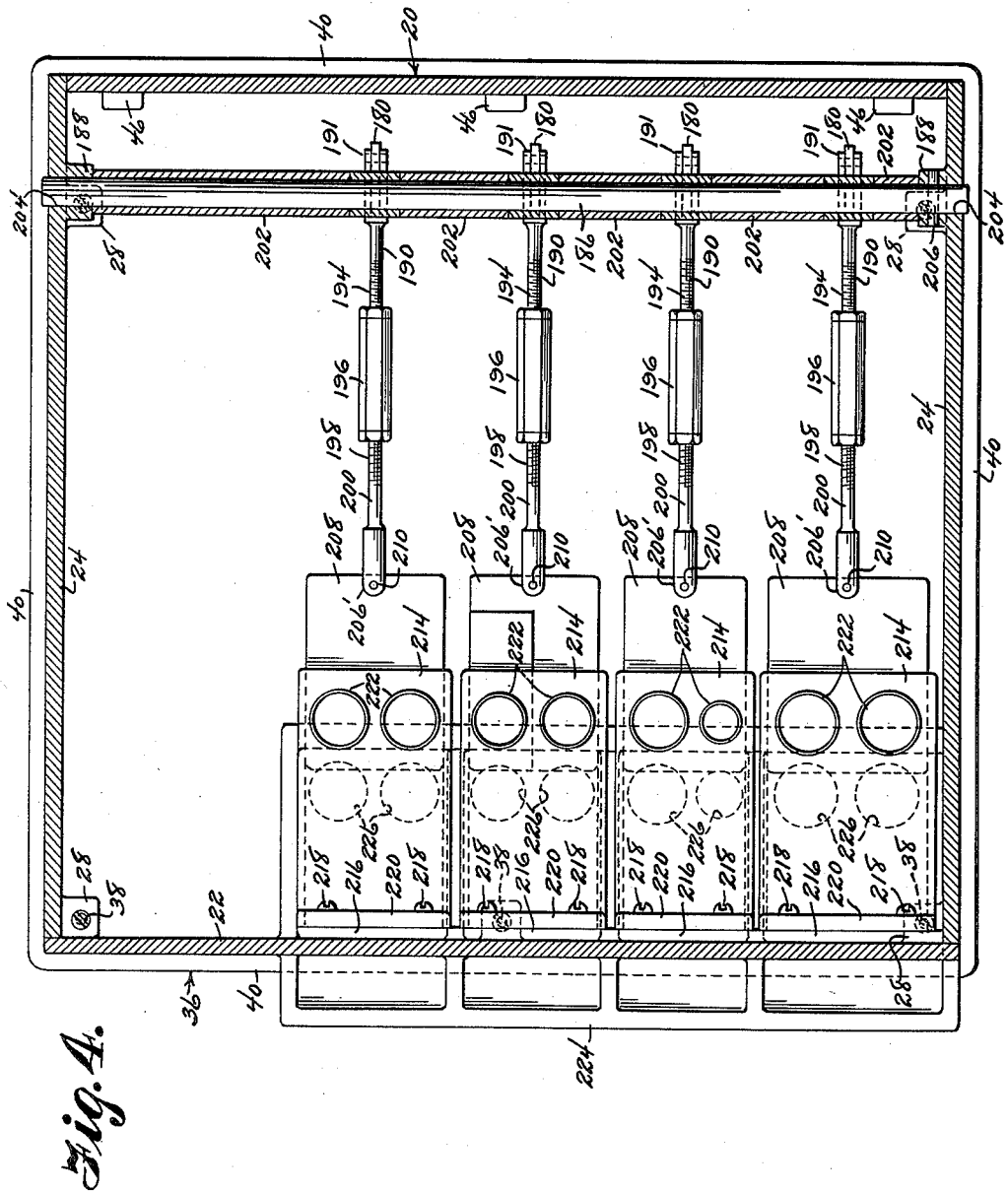
Figure 4 is a sectional view on the line 4—4 of Figure 2.
Figure 5:
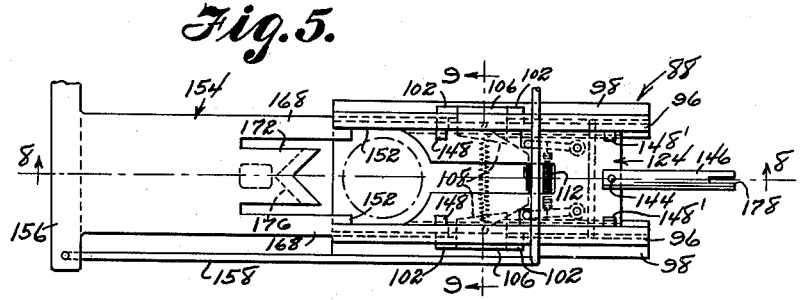
Figure 5 is a plan view of the coin feeding mechanism in receiving position.
Figure 6:
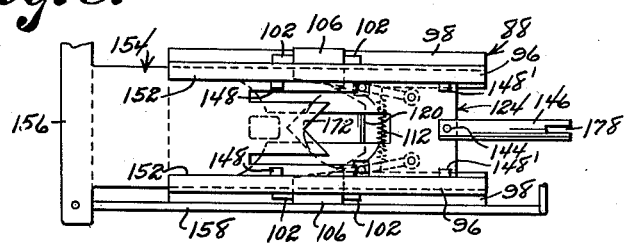
Figure 6 is the same during the feeding of the coin.
Figure 7:
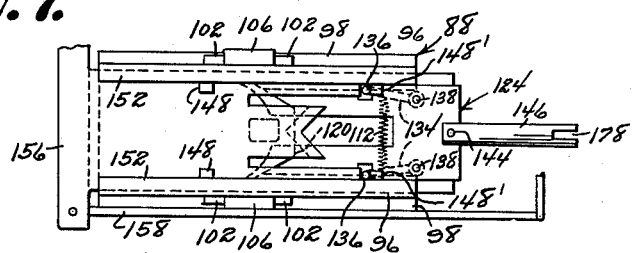
Figure 7 is the same after the coin has been discharged.
Figure 8:
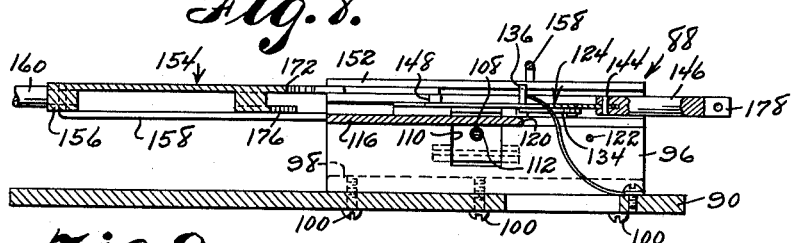
Figure 8 is a sectional view on the line 8—8 of Figure 5.
Figure 9:
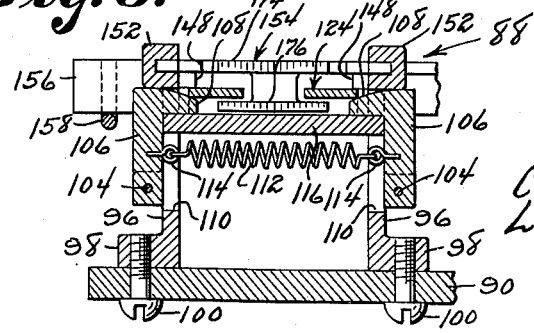
Figure 9 is a sectional view on the line 9—9 of Figure 5.
Figure 15:
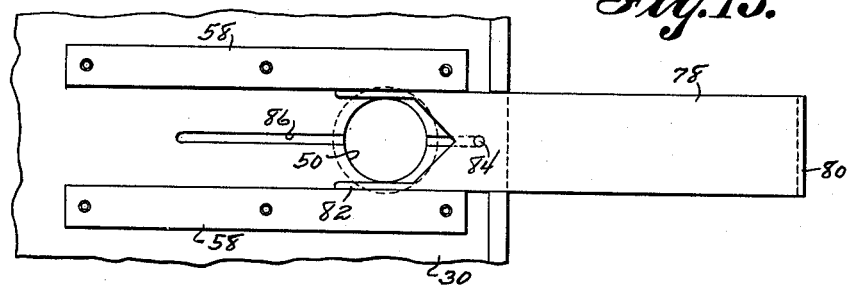
Figure 15 is a bottom plan view of the coin receiving slide.
Figure 16:
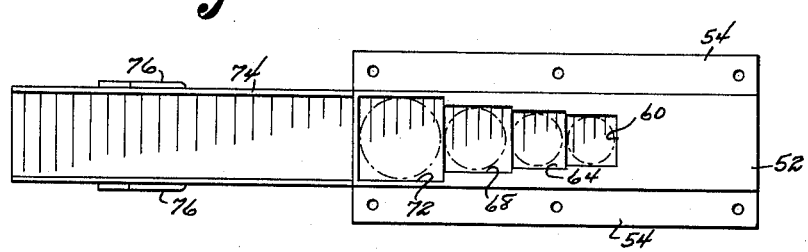
Figure 16 is a top plan of the coin receiving chute supporting plate showing openings for coins of various denominations.
Figure 17:
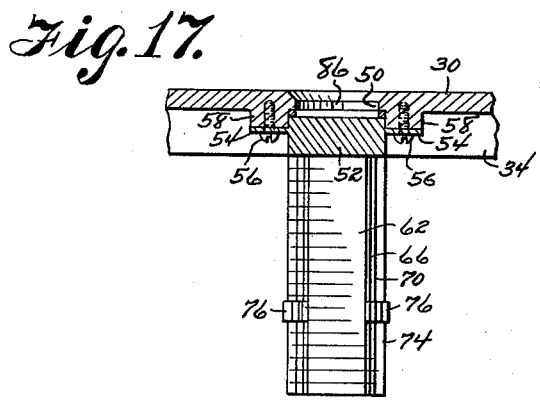
Figure 17 is a sectional view on the line 17—17 of Figure 2.
Figure 18:
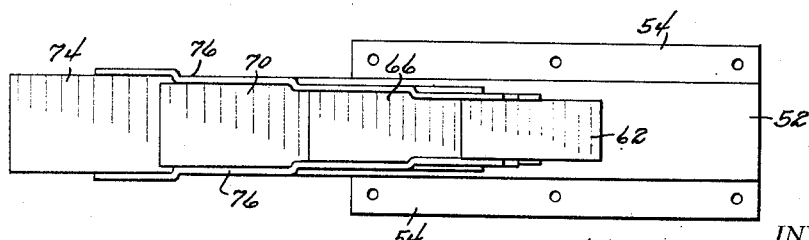
Figure 18 is a bottom plan view of the chute plate shown in Figure 16.

Reading from left to right Figure 2 the first columns are for single quarters in exchange for a half dollar, the next two for two dimes and one nickel in exchange for a quarter followed by a column for two pennies and a second for three pennies in exchange for a nickel and the last two for one nickel each in exchange for a dime. The thickness of the plates 208 will be in accordance with the coins received therein and the coins will be deposited in the coin discharge trays 224 by means of discharge opening 226 in the bottom of the housings 214. The trays 224 are formed on the front wall of the cabinet and extend outwardly thereof. As the plate 124 moves rearwardly it moves the corresponding lever 180 rearwardly by means of the ends 146, the lever pushing the plates 208 forwardly by means of the links 190 and 200 and turnbuckle 196 discharge the change in the trays for the coin deposited.

Each unit as described, has had the operation thereof explained and it is believed that the invention will be apparent to those skilled in the art.

A coin changer has thus been provided which by the use of one coin slot will receive and distribute and change coins of different denominations and it is to be understood that changes may be made in the details of construction, arrangement and combination of the various parts providing they fall within the spirit of the invention and the scope of the appended claim.

Having thus described the invention what is claimed as new and desired to be secured by Letters Patent is:

A machine of the character described, comprising a cabinet, a coin receiving entrance in said cabinet, several coin feeding units disposed in said cabinet below said coin receiving entrance, means in said cabinet below said entrance for diverting a coin deposited in said entrance to one of said coin feeding units, a partition in said cabinet mounting said units in spaced relation to each other, each of said units comprising relatively spaced side walls, a first plate secured between said side walls and arranged adjacent the upper edge of said side walls, a first pair of spring tensioned dogs pivotally mounted on the side walls in opposed relation to each other, inturned ends on said dogs overlying said plate, the space between said inturned ends being less than the diameter of said diverted coin, a pusher plate slidably mounted on said first plate, a coin actuated plate slidably arranged between said side walls and disposed in the path of movement of said pusher plate, means on said pusher plate normally engageable with the dogs for limiting forward movement of said pusher plate, additional means on said pusher plate for engaging the diverted coin and causing the coin to engage the inturned ends and move the dogs out of the path of the pusher plate, a second pair of dogs pivotally connected to said coin actuated plate, said second pair of dogs being normally out of the path of movement of said pusher plate and moveable by the diverted coin into engaging position with the pusher plate, and means for dispensing the coin at the inward movement of said pusher plate.

CHARLES G. EMERSON.
LEE R. COOK.

REFERENCES CITED

The following references are of record in the file of this patent:

UNITED STATES PATENTS

| Number | Name | Date |
| --- | --- | --- |
| 851,303 | McKenzie | Apr. 23, 1907 |
| 1,128,281 | Barili | Feb. 16, 1915 |
| 1,575,537 | Burian | Mar. 2, 1926 |
| 1,801,793 | Chalmers | Apr. 21, 1931 |